(12) United States Patent
Pawar et al.

(10) Patent No.: US 8,068,786 B2
(45) Date of Patent: Nov. 29, 2011

(54) METHOD FOR REDUCING TIME OF FLIGHT INTERFERENCE IN A WIRELESS COMMUNICATION NETWORK

(75) Inventors: Hemanth Balaji Pawar, Herndon, VA (US); Swati Tiwari, Austin, TX (US); Krishna D. Sitaram, Chantilly, VA (US); Jong-hak Jung, Herndon, VA (US); Esmail Hejazi Dinan, Herndon, VA (US)

(73) Assignee: Clear Wireless LLC, Kirkland, WA (US)

( * ) Notice: Subject to any disclaimer, the term of this patent is extended or adjusted under 35 U.S.C. 154(b) by 463 days.

(21) Appl. No.: 12/388,391

(22) Filed: Feb. 18, 2009

(65) Prior Publication Data
US 2010/0210214 A1    Aug. 19, 2010

(51) Int. Cl.
*H04B 1/00* (2006.01)
(52) U.S. Cl. ...................................................... 455/63.1
(58) Field of Classification Search ......................... None
See application file for complete search history.

(56) References Cited

U.S. PATENT DOCUMENTS

| | | | |
|---|---|---|---|
| 6,377,636 B1 | 4/2002 | Paulraj et al. |
| 6,377,819 B1 | 4/2002 | Gesbert et al. |
| 6,643,281 B1 | 11/2003 | Ryan |
| 7,116,632 B2 | 10/2006 | Alapuranen |

*Primary Examiner* — Lincoln Donovan
*Assistant Examiner* — Sibin Chen
(74) *Attorney, Agent, or Firm* — O'Brien Jones, PLLC

(57) ABSTRACT

A method for identifying time of flight interference in a wireless communication network is provided. The method includes detecting interference during a first uplink sub-frame at an interference destination base station, and transmitting a time of flight interference source detection request to a gateway, where the time of flight interference source detection request comprises a time of flight interference period. The method also includes determining one or more base stations in the vicinity of the interference destination base station, where the one or more base stations in the vicinity of the interference destination base station operate at a same frequency as the interference destination base station. The method further includes instructing the one or more base stations in the vicinity of the interference destination base station to re-transmit a preamble at least once in a downlink sub-frame, decoding a first preamble of a first interference source base station at the interference destination base station during a second uplink sub-frame, and identifying the first interference source base station based on the first preamble.

22 Claims, 16 Drawing Sheets

METHOD FOR REDUCING TIME OF FLIGHT INTERFERENCE IN A WIRELESS COMMUNICATION NETWORK

TECHNICAL BACKGROUND

Wireless communication networks have become a popular choice for variety of communications needs. In response to these needs, companies have created large wireless communication networks including a large number of wireless base stations within these networks. Typically, these base stations are configured to operate synchronously. In other words, all of the base stations transmit data to wireless communication devices during a given period of time, and all of the base stations receive data from wireless communication devices during a different period of time. In an Institute of Electrical and Electronics Engineers (IEEE) 802.16 (WiMAX) network, base stations transmit data during a downlink sub-frame and receive data during an uplink sub-frame. These sub-frames are separated from each other by a pair of guards. The guards are periods of time where all of the base stations are idle, and allow for propagation of the uplink and downlink sub-frames to occur without interference. Together the uplink and downlink sub-frames and the guards constitute a WiMAX frame.

In order to provide smooth handoffs to a wireless communication device travelling through the network, the base stations are configured such that their areas of coverage overlap. This allows time for a smooth handoff between base stations while the wireless communication device is in the overlap area. Since all of the base stations are transmitting at the same time, if adjacent base stations were to transmit on the same frequency, their transmissions would interfere with each other in the coverage overlap area. In order to prevent this interference between the two base stations having overlapping coverage, typically the base stations are configured to operate at different frequencies, or are otherwise configured to avoid interference.

Due to the limited number of available frequencies, large wireless communication networks must re-use frequencies. Typically, these networks are designed such that base stations using common frequencies are separated from each other by large distances. Since transmitted radio waves rapidly loose power as they travel over a distance, in many cases simply spreading out the base stations sharing frequencies is sufficient to avoid interference. However, in certain cases, distant base stations sharing frequencies may still interfere with each other.

OVERVIEW

In various embodiments, methods and systems are provided for identifying and reducing time of flight interference in a wireless communication network. In an embodiment, a method for identifying time of flight interference in a wireless communication network is provided. The method includes detecting interference during a first uplink sub-frame at an interference destination base station, and transmitting a time of flight interference source detection request to a gateway, where the time of flight interference source detection request includes a time of flight interference period. The method also includes determining one or more base stations in the vicinity of the interference destination base station, where the one or more base stations in the vicinity of the interference destination base station operate at a same frequency as the interference destination base station.

The method further includes instructing the one or more base stations in the vicinity of the interference destination base station to re-transmit a preamble at least once in a downlink sub-frame, decoding a first preamble of a first interference source base station at the interference destination base station during a second uplink sub-frame, and identifying the first interference source base station based on the first preamble.

In another embodiment, a method for reducing time of flight interference in a wireless communication network is provided. The method includes receiving an identification of a first interference source base station and an identification of an interference destination base station, and calculating a first time of flight interference period. The method also includes receiving first source parameters from the first interference source base station, and receiving destination parameters from the interference destination base station.

The method further includes calculating a first source time of flight criteria for the first interference source base station based on the first source parameters, and calculating a destination time of flight criteria for the interference destination base station based on the destination parameters. The method also includes transmitting a first source time of flight interference message to the first interference source base station when the first source time of flight criteria is less than or equal to the destination time of flight criteria, where the first source time of flight interference message includes a request to shorten a first source base station downlink sub-frame by at least the first time of flight interference period.

The method further includes transmitting a destination time of flight interference message to the interference destination base station when the first source time of flight criteria is greater than the destination time of flight criteria, where the destination time of flight interference message includes a request to shorten a destination base station uplink sub-frame by the first time of flight interference period, and to delay the start of a destination base station uplink sub-frame by the first time of flight interference period.

In a further embodiment, a method for identifying and reducing time of flight interference in a wireless communication network is provided. The method includes detecting interference during a first uplink sub-frame at an interference destination base station, and transmitting a time of flight interference source detection request to a gateway, including a time of flight interference period further including a time period of the first uplink sub-frame during which interference is detected.

The method also includes creating a time of flight interference candidates list containing co-channel base stations in the vicinity of the first base station, and instructing all base stations in the time of flight interference candidates list to re-transmit a preamble at least once in a downlink sub-frame. The method further includes scheduling no packets during a second uplink sub-frame at the interference destination base station, and decoding a preamble of an interference source base station at the interference destination base station during the second uplink sub-frame.

The method also includes identifying an interference source base station based on the preamble, and measuring an interference power and time of flight interference period during the second uplink sub-frame at the interference destination base station. The method further includes calculating a source time of flight criteria for the interference source base station, and calculating a destination time of flight criteria for the interference destination base station.

The method also includes transmitting a source time of flight interference message to the interference source base station when the source time of flight criteria is less than or equal to the destination time of flight criteria, and transmitting a destination time of flight interference message to the interference destination base station when the source time of flight criteria is greater than the destination time of flight criteria.

DETAILED DESCRIPTION

As wireless communication standards evolve into faster and faster communications, time of flight delay may cause a variety of problems. In wireless communication networks where distant base stations may share frequencies, it is possible for the time of flight delay to become larger than the guard between the uplink sub-frame and the downlink sub-frame of a WiMAX frame.

When this occurs, some transmissions from a distant base station may arrive at a local base station during its uplink sub-frame, causing interference with the desired uplink signals. This interference is described in detail below with respect to the figures. Further, a method for identifying interfering base stations is described below, along with a method for reducing time of flight interference.

Figure 1:
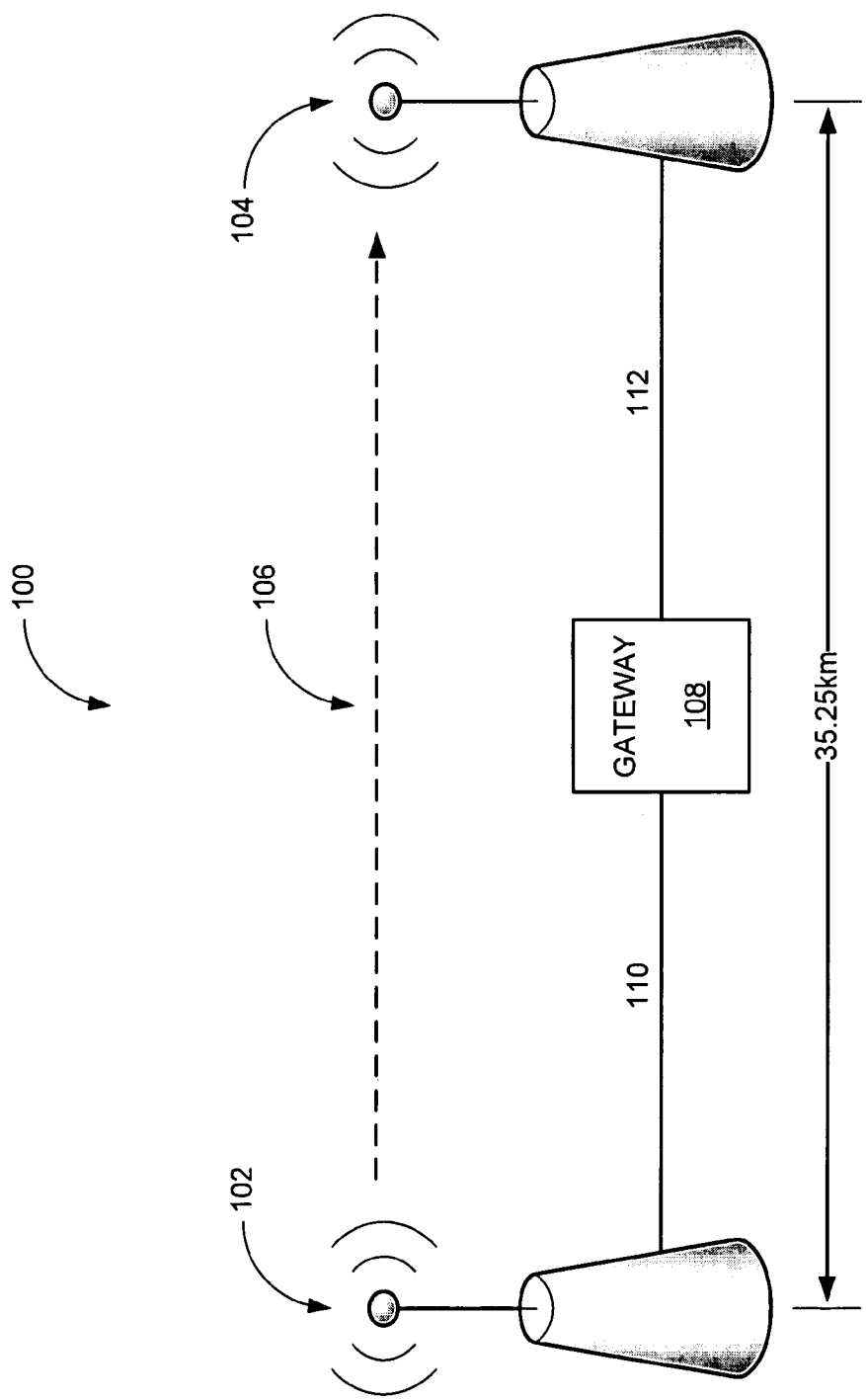
FIG. 1 is a block diagram illustrating time of flight interference in a wireless communication system.

Referring to FIG. 1, a block diagram is provided illustrating an exemplary embodiment for identifying and reducing time of flight interference in wireless communication system 100. In this example, wireless communication system 100 includes interference source base station 102, interference destination base station 104, and gateway 108. Interference source base station 102 exchanges information with gateway 108 through link 110. Interference destination base station 104 exchanges information with gateway 108 through link 112. A transmission from interference source base station 102 received by interference destination base station 104 is represented by dashed arrow 106.

Links 110 and 112 may use any of a variety of communication media, such as air, metal, optical fiber, or any other signal propagation path, including combinations thereof. Also, the links may use any of a variety of communication protocols, such as internet, telephony, optical networking, wireless communication, wireless fidelity, code division multiple access, worldwide interoperability for microwave access, or any other communication protocols and formats, including combinations thereof. Further, the links could be direct links or they might include various intermediate components, systems, and networks.

Communication network 100 may comprise any wireless network that provides communication connectivity for mobile stations to communication with other users. Wireless network protocols that may be utilized by communication network 100 may include code division multiple access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), General Packet Radio Services (GPRS), Worldwide Interoperability for Microwave Access (WiMAX) and the like.

Mobile stations using wireless communication network 100 may be any device that has wireless communication connectivity that may be readily moved from one location to another. Mobile stations could include telephones, smart-phones, mobile phones, cellular phones, personal digital assistants (PDAs), personal communicators, handheld game consoles, personal computers (PCs), Ultra-Mobile personal computers (UMPCs), handheld televisions and any other consumer appliance with wireless communication capabilities.

Gateway 108 provides communication connectivity and acts as an aggregator of traffic or interworking device between one or more base stations or base station controllers (not shown) and a communication network. Examples of gateway 108 may include an access service network gateway (ASN-GW), wireless local access network access gateway (WAG), packet data gateway (PDG), serving GPRS support node (SGSN), mobile switching center (MSC) and packet data serving node (PDSN).

When base stations 102 and 104 operate on the same frequency and are some distance apart, time of flight interference is possible. In this example, a typical WiMAX frame includes a Transmit Transition Guard (TTG) interval of 105.71 µs within a 5 ms frame. Radio waves travel 35.25 km in 105.71 µs, shown in FIG. 1 as the distance between interference source base station 102 and interference destination base station 104. When base stations 102 and 104 are at least 35.25 km apart, it is possible that interference destination base station 104 will receive transmissions from interference source base station 102 during its uplink sub-frame. This potential interference is illustrated in FIGS. 2, 3A, 3B, and 3C and described in detail below.

When interference destination base station 104 detects interference during its uplink sub-frame, it may execute a method illustrated in FIG. 4 and described in detail below to identify the interference source base station. Once the interference source base station is identified, interference destination base station 104 may request gateway 108 to execute a method illustrated in FIGS. 5A and 5B and described in detail below to reduce the time of flight interference.

Figure 2:
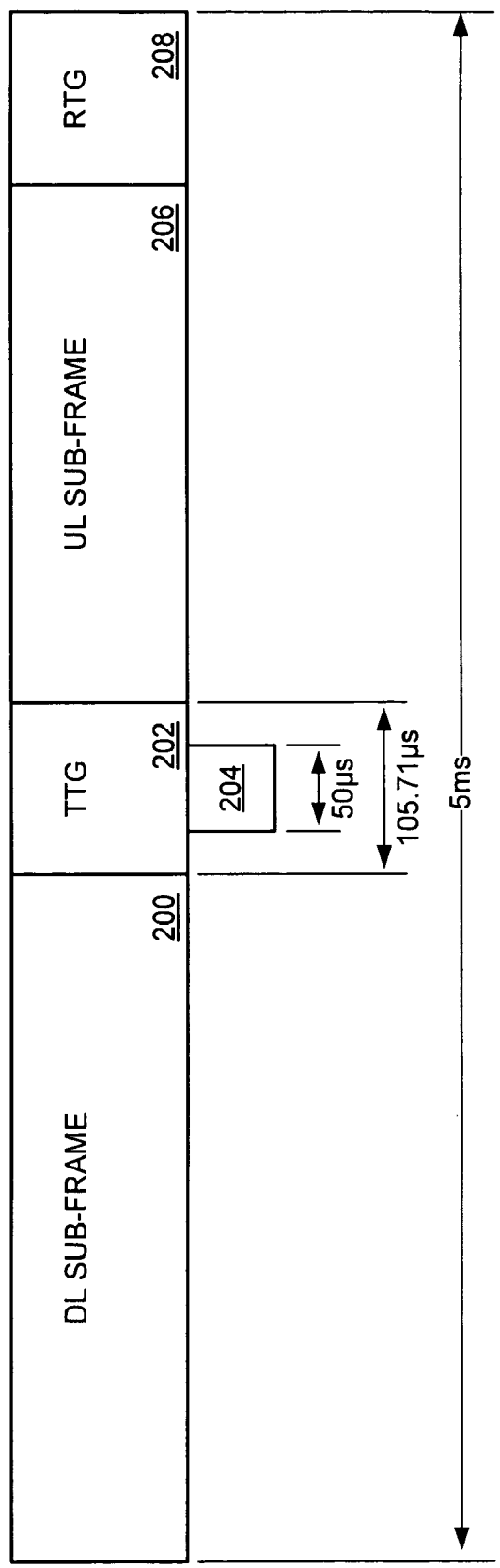
FIG. 2 is a block diagram illustrating a typical WiMAX frame.
Figure 7A:
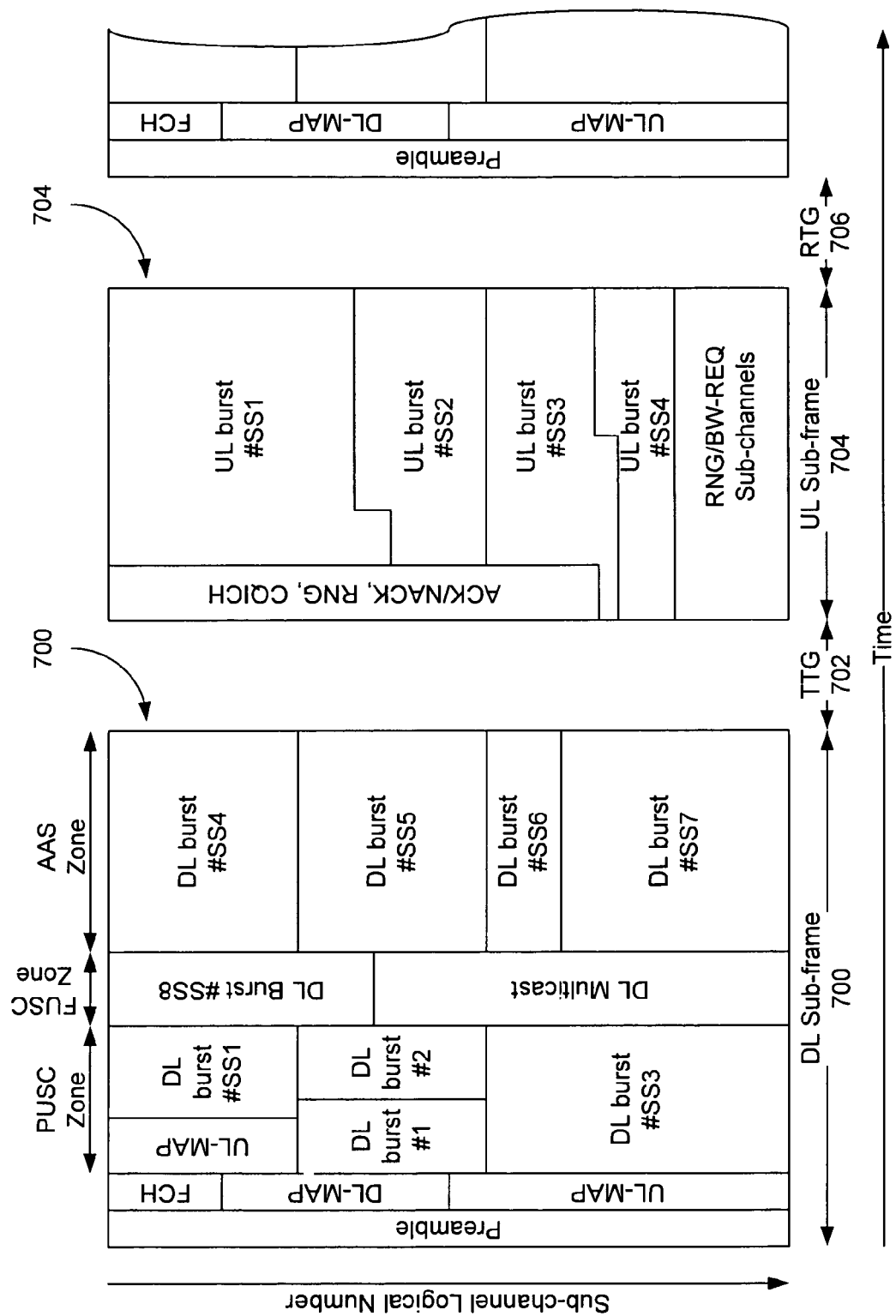
FIGS. 7A, 7B, and 7C are block diagrams of WiMAX frames illustrating a method for reducing time of flight interference in a wireless communication network.
Figure 7B:
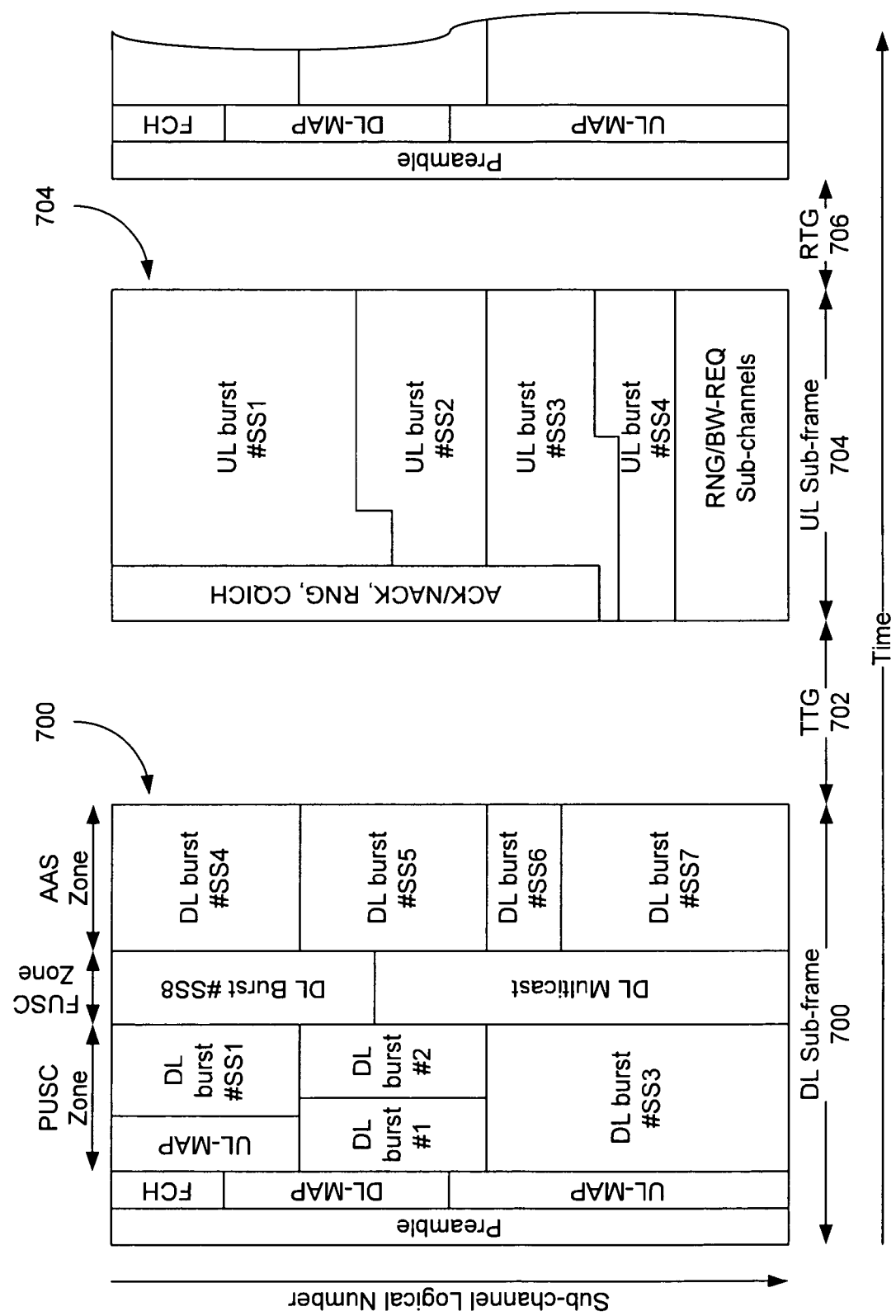
Figure 7C:
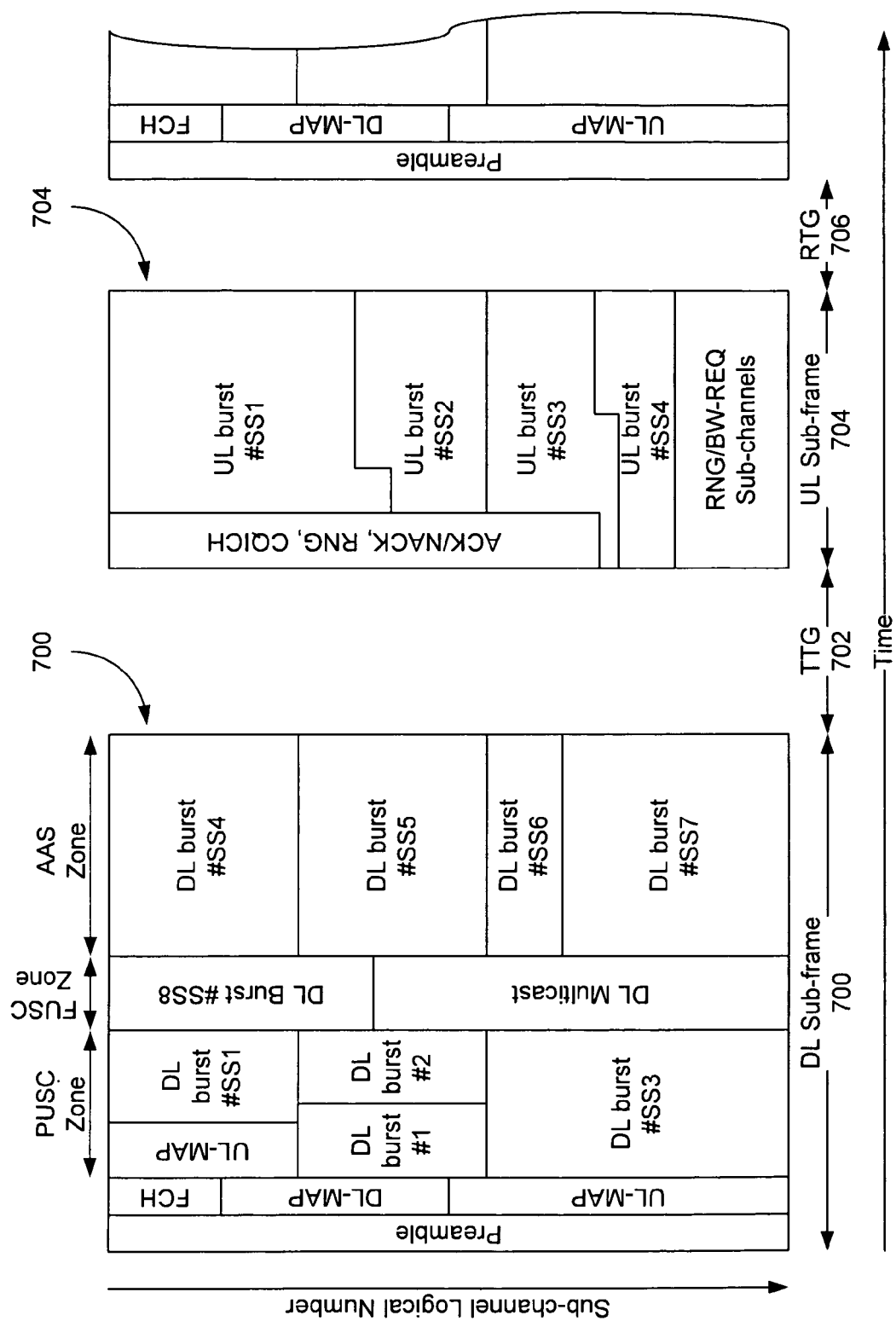

FIG. 2 is a block diagram illustrating a typical WiMAX frame. In this example, a single WiMAX frame lasting 5 ms is illustrated. The frame includes downlink sub-frame 200 during which base stations transmit data, uplink sub-frame 206 during which base stations receive data, Transmit Transition Guard (TTG) interval 202, and Receive Transition Guard (RTG) interval 208. The base stations are idle during the two guard intervals 202 and 208. A Subscriber Station Receive Transition Guard (SSRTG) 204 is shown within the TTG interval 202. In this example, TTG interval 202 is 105.71 µs long and SSRTG interval 204 is 50 μs long. This simplified WiMAX frame is used in FIGS. 3A, 3B, and 3C to describe possible methods of reducing time of flight interference, which are described in detail below. A more detailed WiMAX frame is illustrated in FIGS. 7A, 7B, and 7C to show methods of reducing time of flight interference and is described in detail below.

Figure 3A:
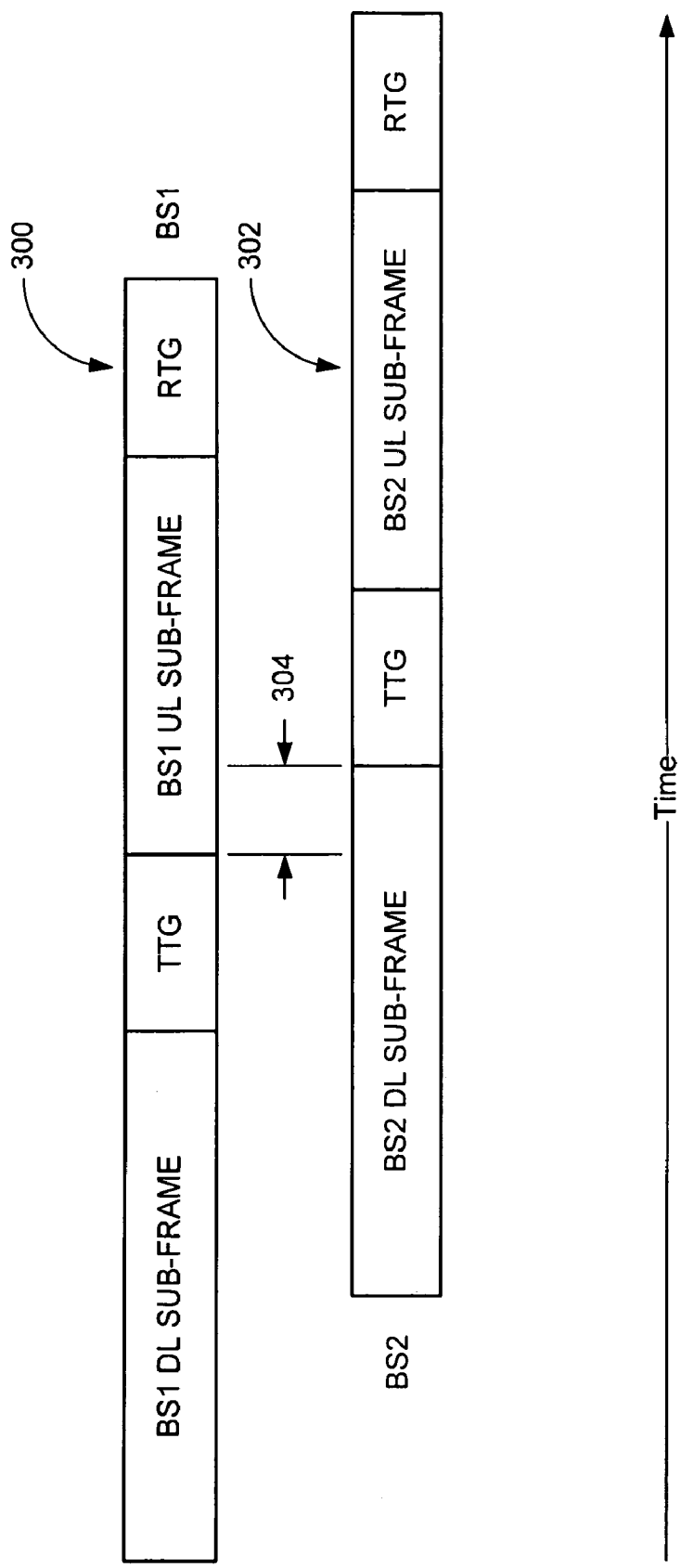
FIGS. 3A, 3B, and 3C are block diagrams illustrating time of flight interference between base stations sharing a common frequency.
Figure 3B:
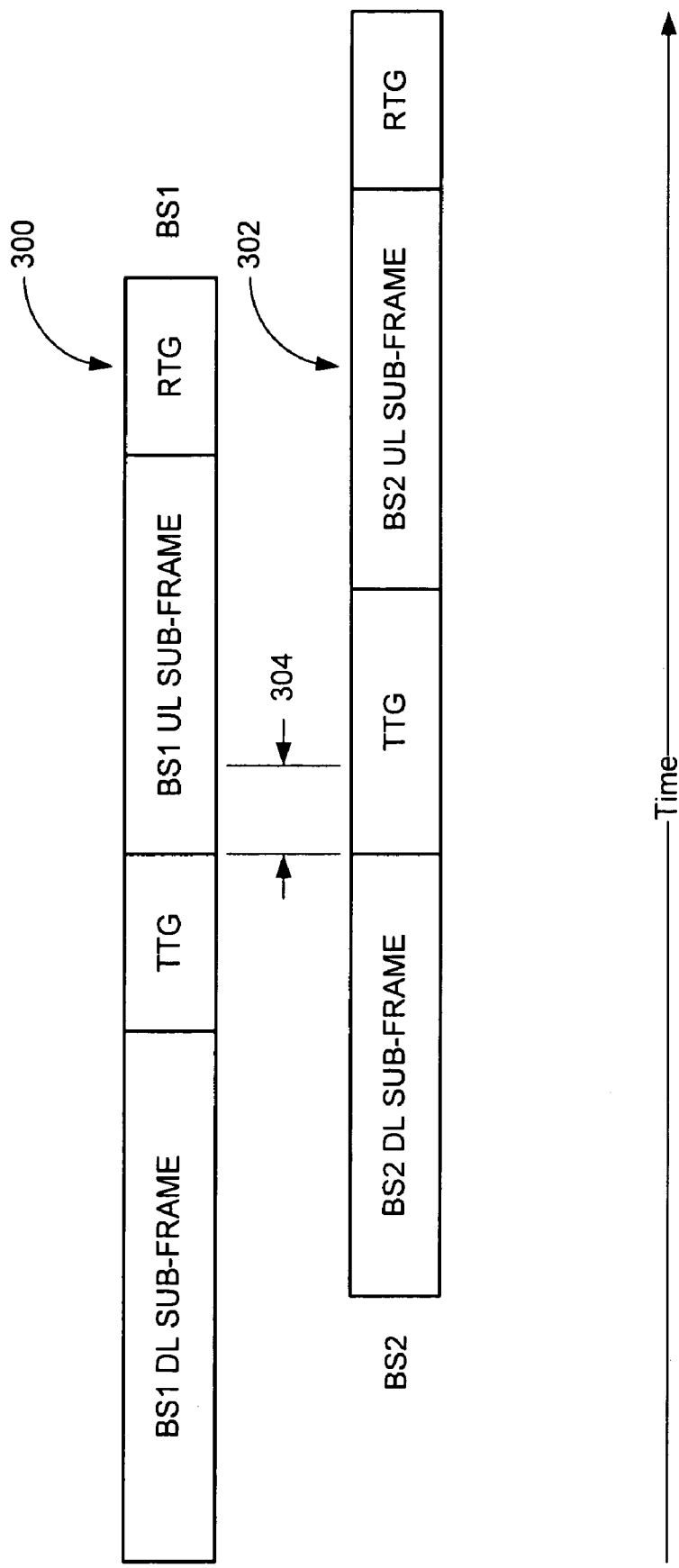
Figure 3C:
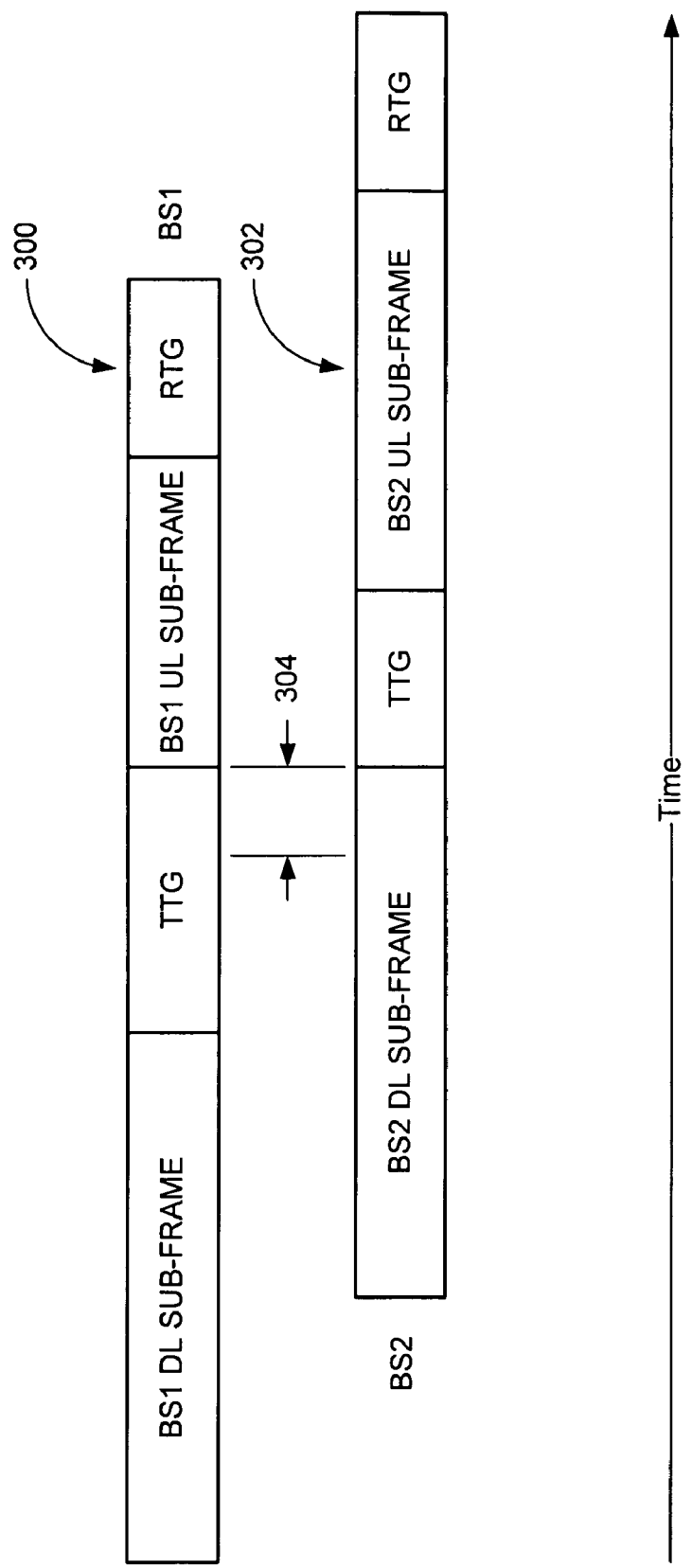

FIGS. 3A, 3B, and 3C are block diagrams illustrating time of flight interference between base stations sharing a common frequency. FIG. 3A illustrates the case of time of flight interference between two base stations. FIG. 3B illustrates a first method of reducing time of flight interference between two base stations. FIG. 3C illustrates a second method of reducing time of flight interference between two base stations.

In an example, FIG. 3A illustrates a WiMAX frame 300 for base station 1, and a WiMAX frame 302 for base station 2. This figure illustrates the situation at the location of base station 1 where it is receiving a delayed WiMAX frame from base station 2. This time of flight delay is due to the propagation speed of radio waves over the distance between base station 1 and base station 2. In this example, base station 1 is an interference destination base station and base station 2 is an interference source base station.

In this example, base stations 1 and 2 operate on a same frequency, and are separated by at least 35.25 km. Notice that due to the time of flight of the signal from base station 2, the downlink sub-frame for base station 2 overlaps the uplink sub-frame for base station 1 by interference period 304. During the uplink sub-frame, base station 1 is receiving communications from wireless devices, and the downlink sub-frame for base station 2 is interfering with this reception. FIGS. 3B and 3C illustrate methods for reducing this time of flight interference to base station 1.

FIG. 3B illustrates a first method for reducing time of flight interference between base stations 1 and 2. In this example, the signal from base station 2 is still delayed due to time of flight by the same amount as illustrated in FIG. 3A. However, here the downlink sub-frame of base station 2 has been shortened by at least interference period 304. In this example, base station 2 has been configured to have a shorter downlink sub-frame along with a correspondingly larger TTG interval such that the overall WiMAX frame length is unchanged.

This method for reducing time of flight interference between the two base stations comes at a cost. Notice that by shortening the downlink sub-frame, the downlink capacity of base station 2 has been reduced. In situations where base station 2 is operating at less than full capacity for downlinks, this solution may come at small or no cost to the communications passing through base station 2. However, if base station 2 is operating at full downlink capacity, this solution will result is lower downlink service quality to the wireless devices using base station 2. In such a case, a different method for reducing time of flight interference may be required. Such a method for reducing time of flight interference is illustrated in FIG. 3C and discussed below.

FIG. 3C illustrates a second method for reducing time of flight interference between base stations 1 and 2. In this example, the signal from base station 2 is still delayed due to time of flight by the same amount as illustrated in FIG. 3A. However, here the uplink sub-frame of base station 1 has been shortened by at least interference period 304. In this example, base station 1 has been configured to have a shorter uplink sub-frame along with a correspondingly larger TTG interval such that the overall WiMAX frame length is unchanged.

This method for reducing time of flight interference between the two base stations comes at a cost. Notice that by shortening the uplink sub-frame, the uplink capacity of base station 1 has been reduced. In situations where base station 1 is operating at less than full capacity for uplinks, this solution may come at small or no cost to the communications passing through base station 1. However, if base station 1 is operating at full uplink capacity, this solution will result is lower uplink service quality to the wireless devices using base station 1.

Several factors may be considered in selecting between these two methods for the reduction of time of flight interference in wireless communication systems. A wide variety of parameters for the base stations may be used in determining the best method in a given situation. For example, parameters from interference source base stations may include average downlink slot utilization, average downlink throughput, average downlink service flows, and average active members of users in each class. Parameters from interference destination base stations may include average uplink slot utilization, average uplink through put, average uplink service flows, and average active members of users in each class.

In some embodiments, a source parameter request message may be sent to potential interference source base stations instructing them to return interference source parameters such as those described above. A destination parameter request message may be sent to the interference destination base station instructing it to return interference destination parameters such as those described above. These parameters are then used to decide whether to shorten the uplink sub-frame for the interference destination base station or to shorten the downlink sub-frame for the interference source base stations.

In some embodiments, a weighted average of source parameters, called a source time of flight criteria, may be compared to a weighted average of destination parameters, called a destination time of flight criteria. When the comparison shows that the downlink time for the interference source base station is more important than the uplink time for the interference destination base station, the interference destination base station may be instructed to shorten its uplink time to reduce time of flight interference from the interference source base station. Conversely, when the comparison shows that the uplink time for the interference destination base station is more important than the downlink time for the interference source base station, the interference source base station may be instructed to shorten its downlink time to reduce time of flight interference to the interference destination base station.

Figure 8:
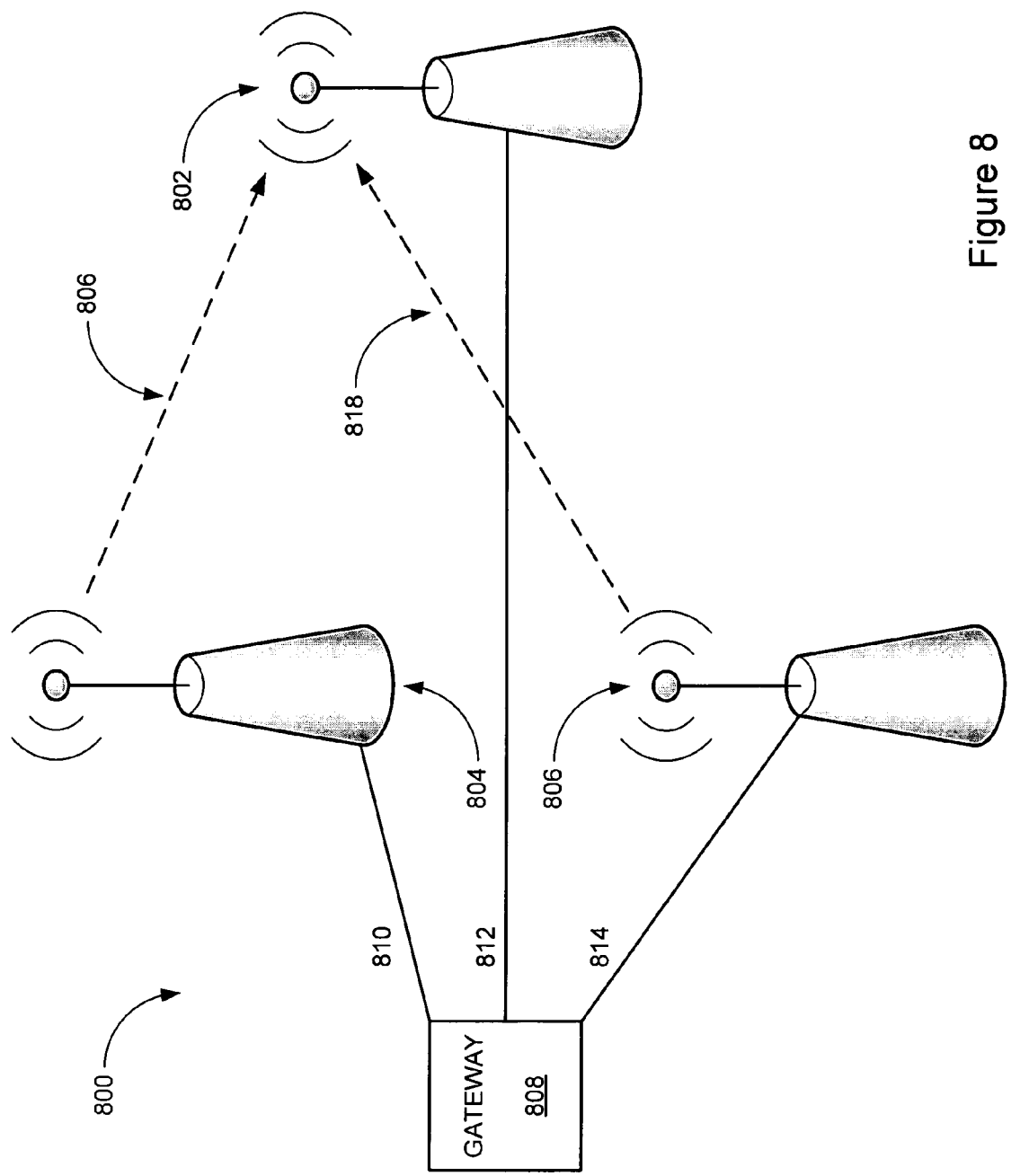
FIG. 8 is a block diagram illustrating time of flight interference in a wireless communication network.

In other embodiments, such as that illustrated in FIG. 8, multiple interference source base stations may be present. In such a case, the weighted sums of each potential interference source base station may be added together to get a total interference source base station criteria. The use of weighted sums in these calculations allows the various parameters to be weighed against each other according to the individual needs of various wireless communication networks. Note that when multiple time of flight interference source base stations are present, each one may have a unique time of flight interference period correlating to the distance between the interference source base stations and the interference destination base station.

Figure 4:
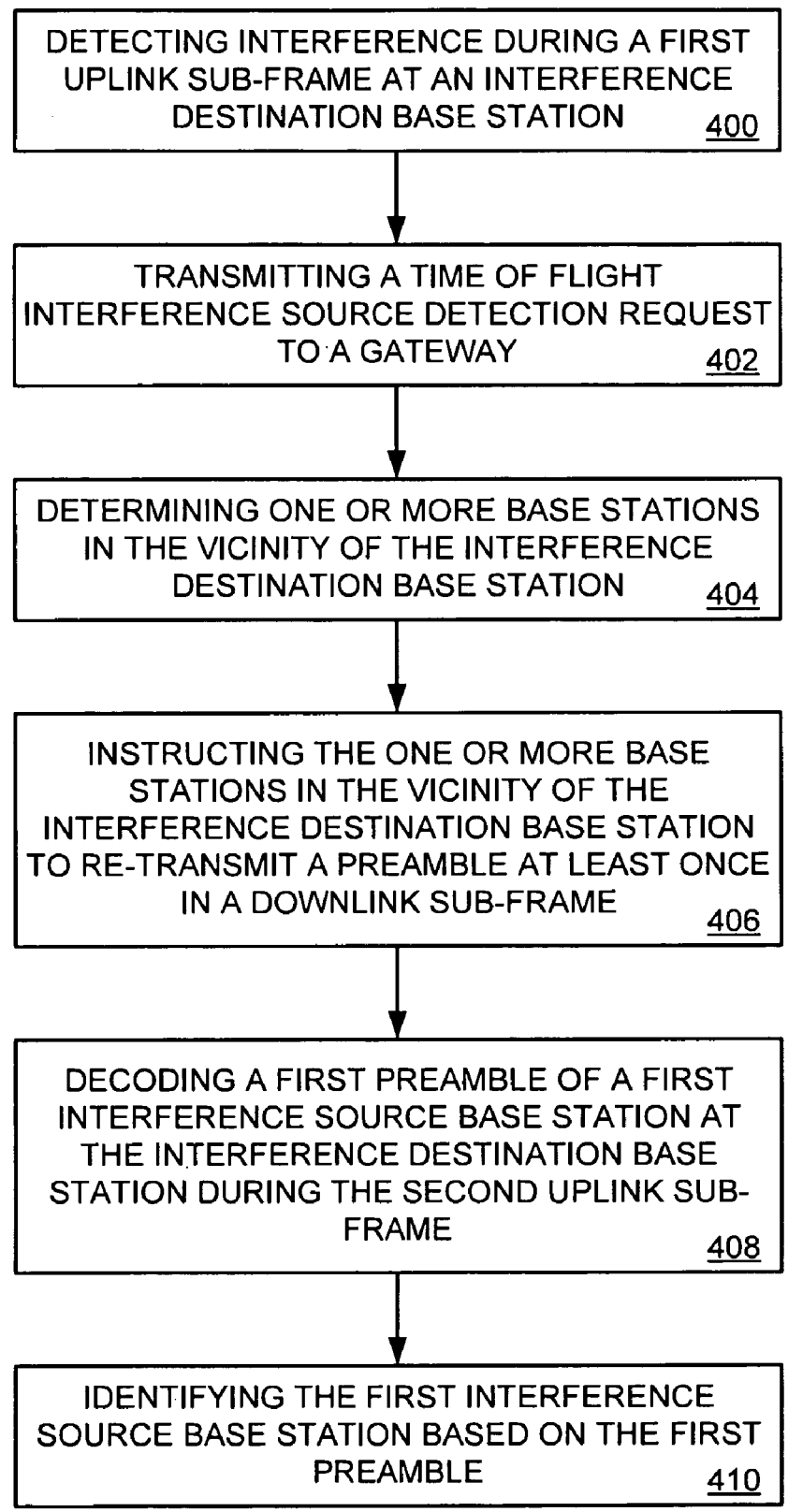
FIG. 4 is a flow diagram illustrating a method for identifying time of flight interference in a wireless communication network.

FIG. 4 is a flow diagram illustrating a method for identifying time of flight interference in a wireless communication network. In this example, interference is detected during a first uplink sub-frame at interference destination base station 104 (operation 400). Interference destination base station 104 transmits a time of flight interference detection request to gateway 108 (operation 402).

In response to the time of flight interference detection request, gateway 108 determines one or more base stations in the vicinity of interference destination base station 104 (operation 404). This determination of interference source base stations may be accomplished using any of a variety of methods. For example, gateway 108 may instruct interference destination base station 104 to refrain from scheduling any uplinks during a second frame to allow interference destination base station 104 to analyze any interferences occurring during the second uplink sub-frame.

Gateway 108 may then instruct the one or more base stations in the vicinity of interference destination base station 104 to re-transmit a preamble at least once in a second downlink sub-frame (operation 406). This operation is timed such that interference destination base station 104 does not schedule any uplinks during the same second frame that the one or more base stations are re-transmitting their preamble during their second downlink sub-frame.

Interference destination base station 104 decodes a first preamble of a first interference source base station 102 during this second uplink sub-frame (operation 408). Interference destination base station 104 identifies the first interference source base station 102 based on the first preamble (operation 410). Note that in some examples more than one interference source base station may be present and multiple interference source base stations may be identified by this method. Once the interference source base stations have been identified, steps may be taken to reduce the time of flight interference caused by these source base stations using a method illustrated in FIGS. 5A and 5B, described in detail below.

Figure 5A:
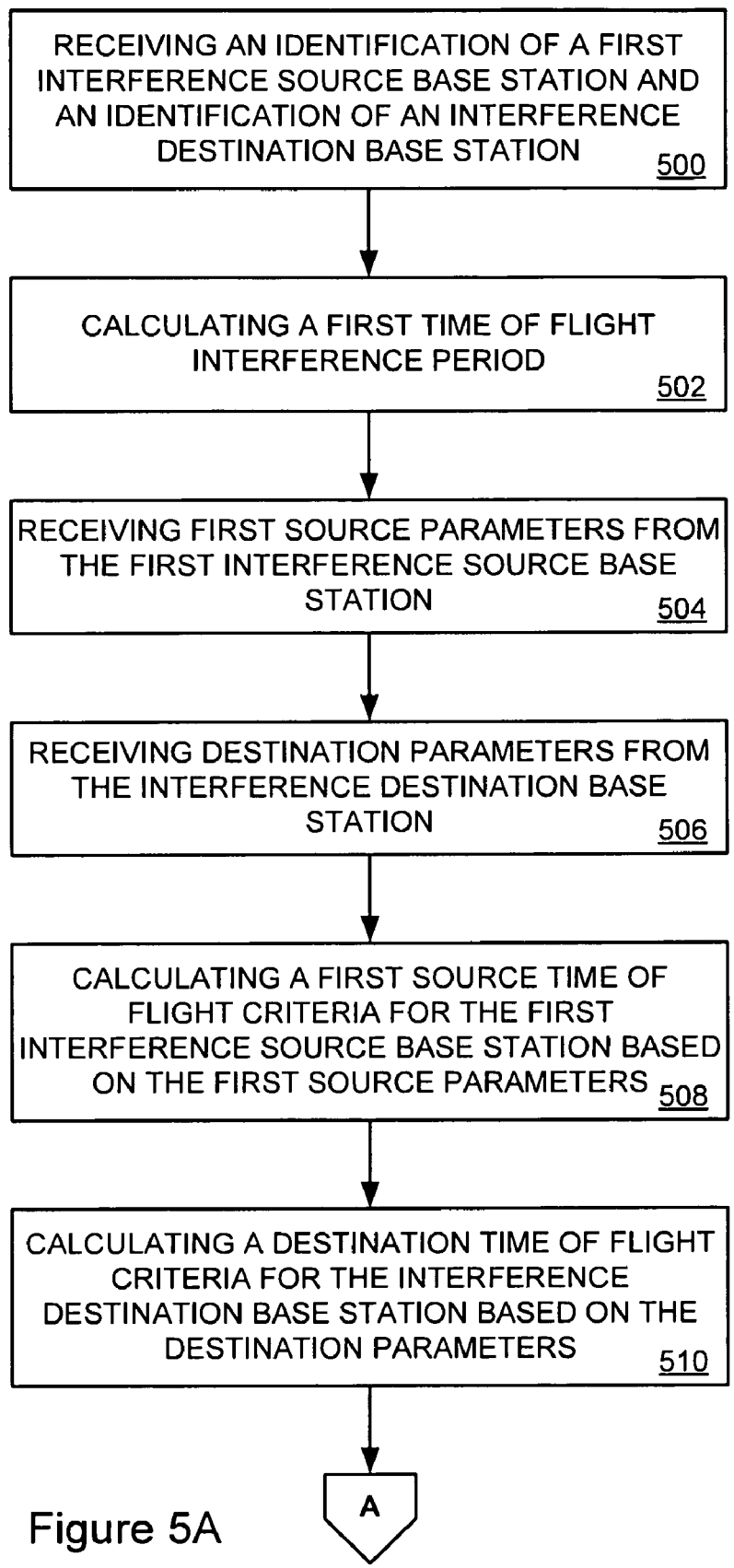
FIGS. 5A and 5B are flow diagrams illustrating a method for reducing time of flight interference in a wireless communication network.
Figure 5B:
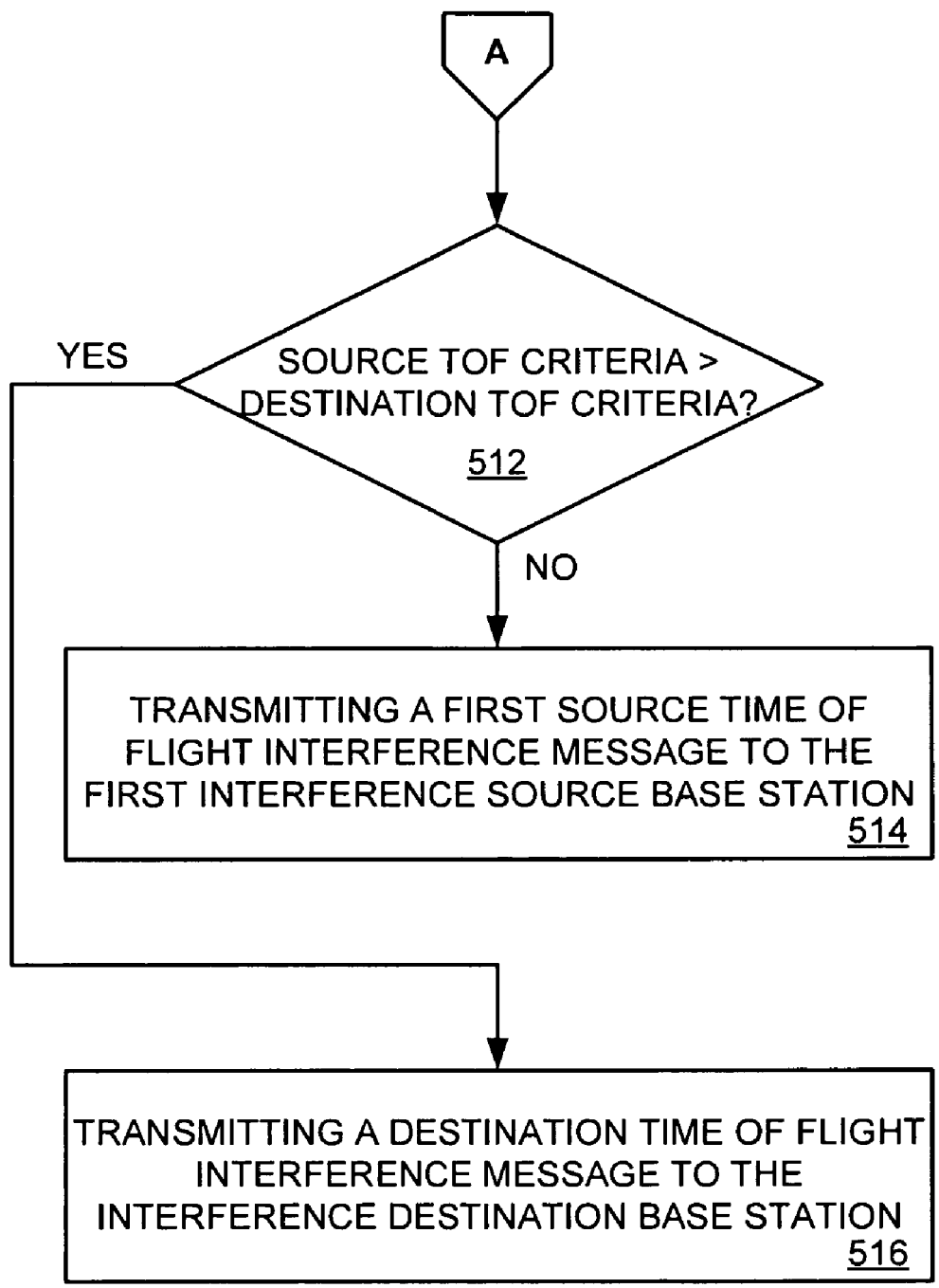

FIGS. 5A and 5B are flow diagrams illustrating a method for reducing time of flight interference in a wireless communication network. In this example, gateway 108 receives an identification of a first interference source base station and an interference destination base station (operation 500). Gateway 108 then calculates a first time of flight interference period (operation 502). This time of flight interference period may be calculated using any of a variety of methods. For example, interference destination base station 104 may measure a duration of interference during any given uplink sub-frame while identifying the interference as caused by first interference source base station 102 by the repeated preamble during the downlink sub-frame of first interference source base station 102.

Gateway 108 receives first source parameters from first interference source base station 102 (operation 504). In some examples, these first source parameters may be received in response to a first source parameter request message sent to first interference source base station 102 from gateway 108. Gateway 108 receives destination parameters from interference destination base station 104 (operation 506). In some examples, these destination parameters may be received in response to a destination parameter request message sent to interference destination base station 104 from gateway 108.

In an embodiment, parameters from interference source base stations may include average downlink slot utilization, average downlink throughput, average downlink service flows, and average active members of users in each class. Parameters from interference destination base stations may include average uplink slot utilization, average uplink through put, average uplink service flows, and average active members of users in each class.

Gateway 108 calculates a first source time of flight criteria for first interference source base station 102 based on the first source parameters (operation 508). In some embodiments, the first source time of flight criteria is a weighted sum of the first source parameters. Gateway 108 calculates a destination time of flight criteria for interference destination base station 104 based on the destination parameters (operation 510). In some embodiments, the destination time of flight criteria is a weighted sum of the destination parameters.

Gateway 108 compares the source time of flight criteria to the destination time of flight criteria (operation 512). If the source time of flight criteria is greater than the destination time of flight criteria, gateway 108 transmits a destination time of flight interference message to interference destination base station 104 (operation 516). If the source time of flight criteria is less than or equal to the destination time of flight criteria, gateway 108 transmits a first source time of flight interference message to first interference source base station 102 (operation 514).

In some embodiments, the first source time of flight interference message contains a request to shorten a first source base station downlink sub-frame by at least the first time of flight interference period. Likewise, the destination time of flight interference message contains a request to shorten a destination base station uplink sub-frame by at least the first time of flight interference period, and to delay the start of a destination base station uplink sub-frame by at least the first time of flight interference period.

Figure 6A:
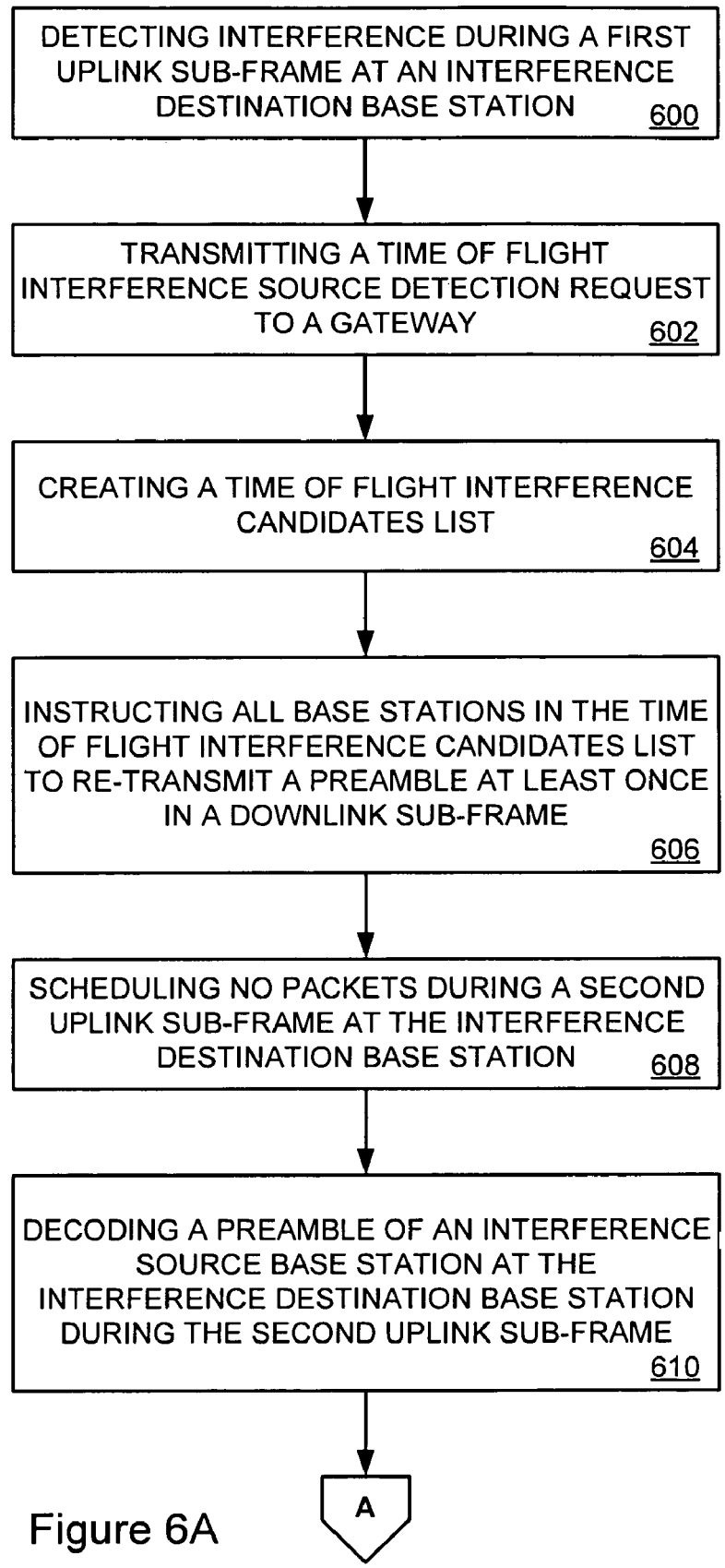
FIGS. 6A, 6B, and 6C are flow diagrams illustrating a method for identifying and reducing time of flight interference in a wireless communication network.
Figure 6B:
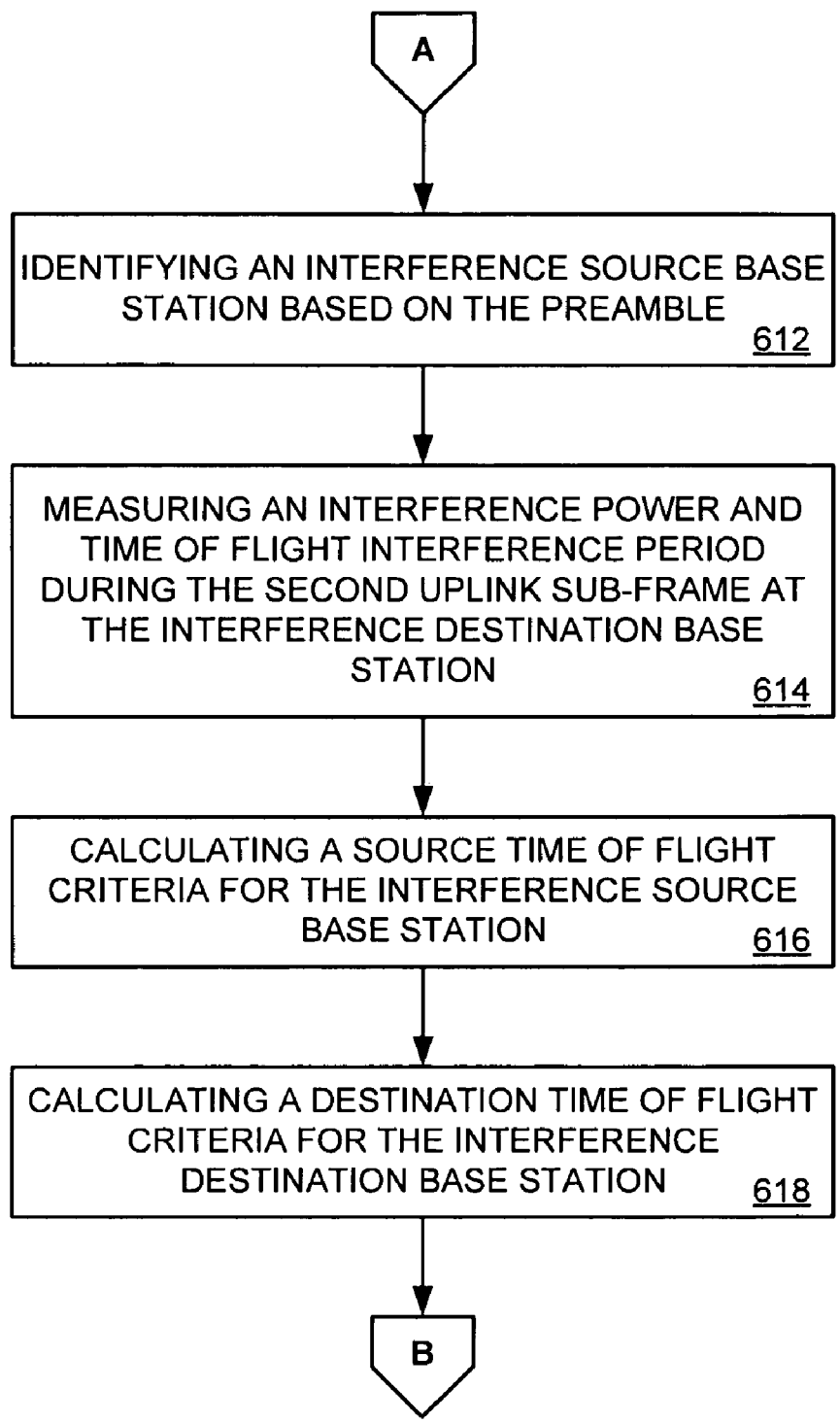
Figure 6C:
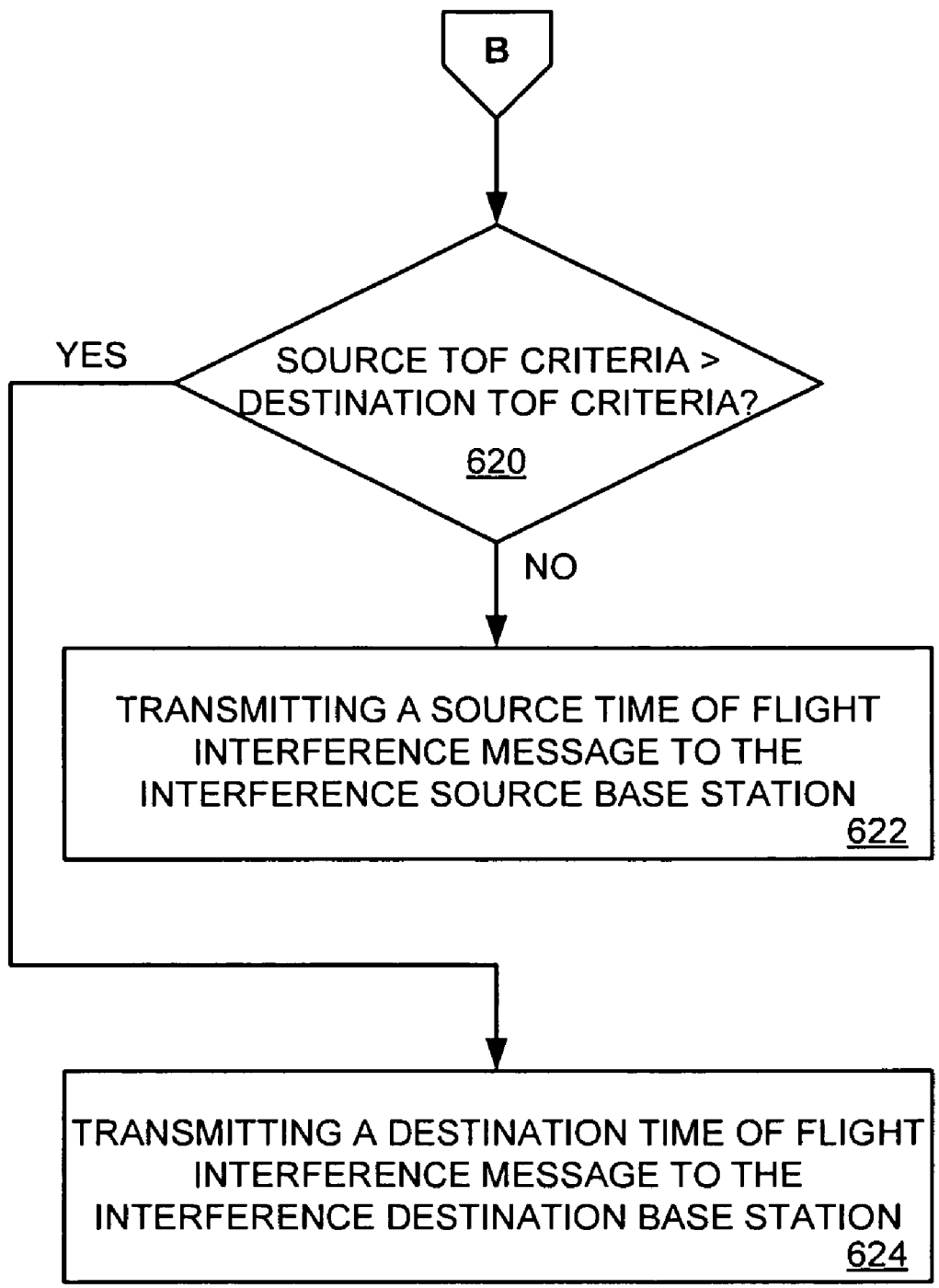

FIGS. 6A, 6B, and 6C are flow diagrams illustrating a method for identifying and reducing time of flight interference in a wireless communication network. In this example, interference destination base station 104 detects interference during a first uplink sub-frame (operation 600). Interference destination base station 104 transmits a time of flight interference source detection request to gateway 108 (operation 602).

Gateway 108 then creates a time of flight interference candidates list (operation 604). This time of flight interference candidates list may be populated using any of a wide variety of methods. For example, all base stations operating on the same frequency as interference destination base station 104 may be included in the list if their distance from interference destination base station 104 is greater than 35.25 km and less than some maximum distance.

Gateway 108 instructs all base stations in the time of flight interference candidates list to re-transmit a preamble at least once in a downlink sub-frame (operation 606). Interference destination base station 104 schedules no packets during a second uplink sub-frame (operation 608). In an example, this second uplink sub-frame corresponds to the frame within which the base stations in the time of flight interference candidates list are re-transmitting a preamble.

Interference destination base station 104 decodes a preamble of interference source base station 102 during the second uplink sub-frame (operation 610). Interference destination base station 104 identifies interference source base station 102 based on the preamble (operation 612).

Interference destination base station 104 measures an interference power and time of flight interference period during the second uplink sub-frame (operation 614). This time of flight interference period may be calculated using any of a variety of methods. For example, interference destination base station 104 may measure a duration of interference during any given uplink sub-frame while identifying the interference as caused by interference source base station 102 by the repeated preamble during the downlink sub-frame of interference source base station 102.

Gateway 108 calculates a source time of flight criteria for interference source base station 102 (operation 616). This calculation may be based upon source parameters received from interference source base station 102. In some examples, these source parameters may be received in response to a source parameter request message sent to interference source base station 102. Parameters from interference source base station 102 may include average downlink slot utilization, average downlink throughput, average downlink service flows, and average active members of users in each class. In some embodiments, the source time of flight criteria is a weighted sum of the source parameters.

Gateway 108 calculates a destination time of flight criteria for interference destination base station 104 (operation 618). This calculation may be based upon destination parameters received from interference destination base station 104. In some examples, these destination parameters may be received in response to a destination parameter request message sent to interference destination base station 104 from gateway 108. Parameters from interference destination base station 104 may include average uplink slot utilization, average uplink through put, average uplink service flows, and average active members of users in each class. In some embodiments, the destination time of flight criteria is a weighted sum of the destination parameters.

Gateway 108 compares the source time of flight criteria to the destination time of flight criteria (operation 620). If the source time of flight criteria is greater than the destination time of flight criteria, gateway 108 transmits a destination time of flight interference message to interference destination base station 104 (operation 624). If the source time of flight criteria is less than or equal to the destination time of flight criteria, gateway 108 transmits a first source time of flight interference message to interference source base station 102 (operation 622).

In some embodiments, the source time of flight interference message contains a request to shorten a source base station downlink sub-frame by at least the time of flight interference period. Likewise, the destination time of flight interference message contains a request to shorten a destination base station uplink sub-frame by at least the time of flight interference period, and to delay the start of a destination base station uplink sub-frame by at least the time of flight interference period.

FIGS. 7A, 7B, and 7C are block diagrams of WiMAX frames illustrating a method for reducing time of flight interference in a wireless communication network. FIG. 7A is a block diagram of a normal WiMAX frame. This WiMAX frame includes downlink sub-frame 700 during which base stations transmit data, uplink sub-frame 704 during which base stations receive data, Transmit Transition Guard (TTG) interval 702, and Receive Transition Guard (RTG) interval 706. The base stations are idle during the two guard intervals 702 and 706.

Notice that both downlink sub-frame 700 and uplink sub-frame 704 include a variety of different blocks of data. In particular, downlink sub-frame 700 normally begins with a preamble which identifies the transmitting base station. This preamble may be re-transmitted later during the downlink sub-frame in response to a command from gateway 108.

FIG. 7B is a block diagram of a modified WiMAX frame configured to reduce time of flight interference in a wireless communication network. In this example, downlink sub-frame 700 has been shortened and the TTG interval 702 has been lengthened to avoid causing interference with interference destination base station 104. FIG. 7B corresponds to the method for the reduction of time of flight interference illustrated in FIG. 3B, but showing more details within uplink sub-frame 700 and downlink sub-frame 704.

FIG. 7C is a block diagram of a modified WiMAX frame configured to reduce time of flight interference in a wireless communication network. In this example, uplink sub-frame 704 has been shortened and the TTG interval 702 has been lengthened to avoid interference from interference source base station 102. FIG. 7C corresponds to the method for the reduction of time of flight interference illustrated in FIG. 3C, but showing more details within uplink sub-frame 700 and downlink sub-frame 704.

Referring to FIG. 8, a block diagram is provided illustrating an exemplary embodiment for identifying and reducing time of flight interference in a wireless communication system 800. In this example wireless communication system 800 includes first interference source base station 804, second interference source base station 806, interference destination base station 802, and gateway 808. First interference source base station 804 exchanges information with gateway 808 through link 810. Second interference source base station 806 exchanges information with gateway 808 through link 814. Interference destination base station 802 exchanges information with gateway 808 through link 812.

Links 801, 812, and 814 may use any of a variety of communication media, such as air, metal, optical fiber, or any other signal propagation path, including combinations thereof. Also, the links may use any of a variety of communication protocols, such as internet, telephony, optical networking, wireless communication, wireless fidelity, code division multiple access, worldwide interoperability for microwave access, or any other communication protocols and formats, including combinations thereof. Further, the links could be direct links or they might include various intermediate components, systems, and networks.

Communication network 800 may comprise any wireless network that provides communication connectivity for mobile stations to communication with other users. Wireless network protocols that may be utilized by communication network 800 may include code division multiple access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), General Packet Radio Services (GPRS), Worldwide Interoperability for Microwave Access (WiMAX) and the like.

Mobile stations using wireless communication network 800 may be any device that has wireless communication connectivity that may be readily moved from one location to another. Mobile stations could include telephones, smartphones, mobile phones, cellular phones, personal digital assistants (PDAs), personal communicators, handheld game consoles, personal computers (PCs), Ultra-Mobile personal computers (UMPCs), handheld televisions and any other consumer appliance with wireless communication capabilities.

Gateway 808 provides communication connectivity and acts as an aggregator of traffic or interworking device between one or more base stations or base station controllers (not shown) and a communication network. Examples of gateway 808 may include an access service network gateway (ASN-GW), wireless local access network access gateway (WAG), packet data gateway (PDG), serving GPRS support node (SGSN), mobile switching center (MSC) and packet data serving node (PDSN).

When base stations 802, 804, and 806 operate on the same frequency and are some distance apart, time of flight interference is possible. In this example, a typical WiMAX frame includes a Transmit Transition Guard (TTG) interval of 105.71 µs within a 5 ms frame. Radio waves travel 35.25 km in 105.71 µs, shown in FIG. 1 as the distance between interference source base station 102 and interference destination base station 104. When base stations 804 and 806 are at least 35.25 km from base station 802, it is possible that interference destination base station 802 will receive transmissions from first interference source base station 804 and second interference source base station 806 during its uplink sub-frame. This potential interference is illustrated in FIGS. 2, 3A, 3B, and 3C and described in detail above.

When interference destination base station 802 detects interference during its uplink sub-frame, it may execute the method illustrated in FIG. 4 and described in detail above to identify the interference source base station. Once the interference source base station is identified, interference destination base station 802 may request gateway 808 to execute the method illustrated in FIGS. 5A and 5B and described in detail above to reduce the time of flight interference.

The methods, systems, devices, processors, equipment, and servers described above may be implemented with, contain, or be executed by one or more computer systems. The methods described above may also be stored on a computer readable medium for execution by a computer system. Many of the elements of communication systems 100 and 800 may be, comprise, or include computer systems. This includes, but is not limited to: interference source base station 102, interference destination base station 104, gateway 108, first interference source base station 804, second interference source base station 806, interference destination base station 802, and gateway 808. These computer systems are illustrated, by way of example, in FIG. 9.

Figure 9:
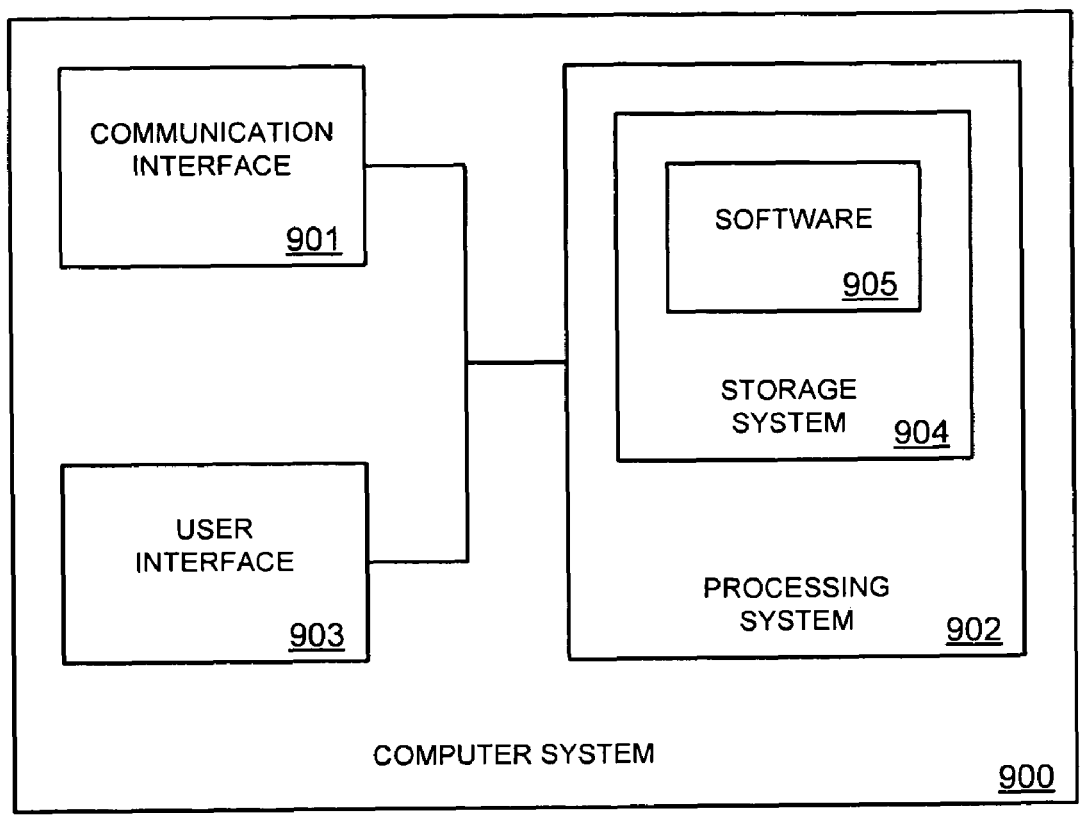
FIG. 9 is a block diagram illustrating a computer system that may be utilized by the network elements described in FIGS. 1 and 8 and for the methods described herein and illustrated in FIGS. 2-7.

FIG. 9 is a block diagram illustrating a computer system that may be utilized by the network elements described in FIGS. 1 and 8 and for the methods described herein. Computer system 900 includes communication interface 901, processing system 902, and user interface 903. Processing system 902 includes storage system 904. Storage system 904 stores software 905. Processing system 902 is linked to communication interface 901 and user interface 903. Computer system 900 could be comprised of a programmed general-purpose computer, although those skilled in the art will appreciate that programmable or special purpose circuitry and equipment may be used. Computer system 900 may be distributed among multiples devices that together comprise elements 900-905.

Communication interface 901 could comprise a network interface, modem, port, transceiver, or some other communication device. Communication interface 901 may be distributed among multiple communication devices. Processing system 902 could comprise a computer microprocessor, logic circuit, or some other processing device. Processing system 902 may be distributed among multiple processing devices. User interface 903 could comprise a keyboard, mouse, voice recognition interface, microphone and speakers, graphical display, touch screen, or some other type of user device. User interface 903 may be distributed among multiple user devices. Storage system 904 could comprise a disk, tape, integrated circuit, server, or some other memory device. Storage system 904 may be distributed among multiple memory devices.

Processing system 902 retrieves and executes software 905 from storage system 904. Software 905 may comprise an operating system, utilities, drivers, networking software, and other software typically loaded onto a computer system. Software 905 could comprise an application program, firmware, or some other form of machine-readable processing instructions. When executed by processing system 902, software 905 directs processing system 902 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for identifying time of flight interference in a wireless communication network, the method comprising:
    detecting interference during a first uplink sub-frame at an interference destination base station;
    transmitting a time of flight interference source detection request to a gateway, wherein the time of flight interference source detection request comprises a time of flight interference period;
    determining one or more base stations in the vicinity of the interference destination base station, wherein the one or more base stations in the vicinity of the interference destination base station operate at a same frequency as the interference destination base station;
    instructing the one or more base stations in the vicinity of the interference destination base station to re-transmit a preamble at least once in a downlink sub-frame;
    decoding a first preamble of a first interference source base station at the interference destination base station during a second uplink sub-frame; and
    identifying the first interference source base station based on the first preamble.

2. The method of claim 1 wherein the time of flight interference period comprises a time period of the first uplink sub-frame during which interference is detected.

3. The method of claim 1 further comprising:
    scheduling no packets during a second uplink sub-frame at the interference destination base station.

4. The method of claim 1 further comprising:
    decoding a second preamble of a second interference source base station at the interference destination base station during the second uplink sub-frame; and
    identifying the second interference source base station based on the second preamble.

5. A method for reducing time of flight interference in a wireless communication network, the method comprising:
    receiving an identification of a first interference source base station and an identification of an interference destination base station;
    calculating a first time of flight interference period;
    receiving first source parameters from the first interference source base station;
    receiving destination parameters from the interference destination base station;
    calculating a first source time of flight criteria for the first interference source base station based on the first source parameters;
    calculating a destination time of flight criteria for the interference destination base station based on the destination parameters;
    transmitting a first source time of flight interference message to the first interference source base station when the first source time of flight criteria is less than or equal to the destination time of flight criteria, wherein the first source time of flight interference message comprises a request to shorten a first source base station downlink sub-frame by at least the first time of flight interference period; and
    transmitting a destination time of flight interference message to the interference destination base station when the first source time of flight criteria is greater than the destination time of flight criteria, wherein the destination time of flight interference message comprises a request to shorten a destination base station uplink sub-frame by at least the first time of flight interference period, and to delay the start of a destination base station uplink sub-frame by at least the first time of flight interference period.

6. The method of claim 5 wherein calculating a first time of flight interference period comprises:
scheduling no data during a second uplink sub-frame at the interference destination base station; and
measuring a first interference power and first time of flight interference period during the second uplink sub-frame at the interference destination base station.

7. The method of claim 5 further comprising:
transmitting a first source parameter request message to the first interference source base station, wherein the first source parameters are received in response to the first source parameter request message; and
transmitting a destination parameter request message to the interference destination base station, wherein the destination parameters are received in response to the destination parameter request message.

8. The method of claim 5,
wherein the first source parameters comprise a first average downlink slot utilization, a first average downlink throughput, first average downlink service flows, and a first average active numbers of users in each class; and
wherein the destination parameters comprise an average uplink slot utilization, an average uplink throughput, average uplink service flows, and an average active number of users in each class.

9. The method of claim 8,
wherein the first source time of flight criteria is a weighted sum of the first source parameters; and
wherein the destination time of flight criteria is a weighted sum of the destination parameters.

10. The method of claim 5 further comprising:
receiving an identification of a second interference source base station;
calculating a second time of flight interference period;
receiving second source parameters from the second interference source base station;
calculating a second time of flight criteria for the second interference source base station based on the second source parameters, wherein the second source time of flight criteria is a weighted sum of the second source parameters;
transmitting a first source time of flight interference message to the first interference source base station and a second source time of flight interference message to the second source base station when the sum of the first and second source time of flight criteria is less than or equal to the destination time of flight metric; and
transmitting a destination time of flight interference message to the interference destination base station when the sum of the first and second source time of flight criteria is greater than the destination time of flight metric.

11. The method of claim 10 wherein calculating a second time of flight interference period comprises:
scheduling no data during a second uplink sub-frame at the interference destination base station; and
measuring a second interference power and second time of flight interference period during the second uplink sub-frame at the interference destination base station.

12. The method of claim 10 wherein the second source parameters comprise a second average downlink slot utilization, a second average downlink throughput, second average downlink service flows, and a second average active numbers of users in each class.

13. The method of claim 10 wherein the second source time of flight interference message instructs the second interference source base station to shorten its downlink sub-frames by the second time of flight interference period.

14. The method of claim 10 wherein the destination time of flight interference message instructs the interference destination base station to shorten its uplink sub-frames by the greater of the first and second time of flight interference period, and to delay the start of its uplink sub-frames by the greater of the first and second time of flight interference period.

15. A method for identifying and reducing time of flight interference in a wireless communication network, the method comprising:
detecting interference during a first uplink sub-frame at an interference destination base station;
transmitting a time of flight interference source detection request to a gateway, including a time of flight interference period comprising a time period of the first uplink sub-frame during which interference is detected;
creating a time of flight interference candidates list comprising co-channel base stations in the vicinity of the first base station;
instructing all base stations in the time of flight interference candidates list to re-transmit a preamble at least once in a downlink sub-frame;
scheduling no packets during a second uplink sub-frame at the interference destination base station;
decoding a preamble of an interference source base station at the interference destination base station during the second uplink sub-frame;
identifying the interference source base station based on the preamble;
measuring an interference power and time of flight interference period during the second uplink sub-frame at the interference destination base station;
calculating a source time of flight criteria for the interference source base station;
calculating a destination time of flight criteria for the interference destination base station;
transmitting a source time of flight interference message to the interference source base station when the source time of flight criteria is less than or equal to the destination time of flight criteria; and
transmitting a destination time of flight interference message to the interference destination base station when the source time of flight criteria is greater than the destination time of flight criteria.

16. The method of claim 15 wherein the source time of flight interference message instructs the interference source base station to shorten its downlink sub-frames by the time of flight interference period.

17. The method of claim 15 wherein the destination time of flight interference message instructs the interference destination base station to shorten its uplink sub-frames by the time of flight interference period, and to delay the start of its uplink sub-frames by the time of flight interference period.

18. The method of claim 15 further comprising:
transmitting a source parameter request message to the interference source base station;
receiving source parameters from the interference source base station in response to the source parameter request message;

transmitting a destination parameter request message to the interference destination base station; and receiving destination parameters from the interference destination base station in response to the destination parameter request message.

19. The method of claim 18, wherein the source parameters comprise an average downlink slot utilization, an average downlink throughput, average downlink service flows, and an average active numbers of users in each class; and wherein the destination parameters comprise an average uplink slot utilization, an average uplink throughput, average uplink service flows, and an average active number of users in each class.

20. The method of claim 19, wherein the source time of flight criteria is a weighted sum of the source parameters; and wherein the destination time of flight criteria is a weighted sum of the destination parameters.

21. The method of claim 15 wherein creating a time of flight interference candidates list includes calculating the distance between each time of flight interference candidate and the interference source base station, and determining a line of sight between each time of flight interference candidate and the interference source base station.

22. The method of claim 15 further comprising:

triggering an alarm if no preamble is decoded during the uplink sub-frame.

* * * * *